United States Patent
Helbig

(10) Patent No.: US 8,054,781 B2
(45) Date of Patent: Nov. 8, 2011

(54) CHANNEL COORDINATION IN WIRELESS NETWORK SYSTEMS

(75) Inventor: Tobias Helbig, Godstone (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1266 days.

(21) Appl. No.: 10/567,225

(22) PCT Filed: Jul. 28, 2004

(86) PCT No.: PCT/IB2004/051307
§ 371 (c)(1),
(2), (4) Date: Feb. 3, 2006

(87) PCT Pub. No.: WO2005/015839
PCT Pub. Date: Feb. 17, 2005

(65) Prior Publication Data
US 2006/0217067 A1    Sep. 28, 2006

(30) Foreign Application Priority Data
Aug. 7, 2003   (EP) .................................. 03102468

(51) Int. Cl.
*H04W 4/00*   (2009.01)
(52) U.S. Cl. ........ 370/329; 455/450; 455/41.1; 370/338
(58) Field of Classification Search ............... 370/328, 370/329, 338, 330; 455/450–453, 501, 509, 455/446–448
See application file for complete search history.

(56) References Cited

U.S. PATENT DOCUMENTS

| | | | |
|---|---|---|---|
| 5,515,509 A | | 5/1996 | Rom |
| 5,933,420 A | * | 8/1999 | Jaszewski et al. ............. 370/329 |
| 6,208,629 B1 | | 3/2001 | Jaszewski et al. |
| 6,496,490 B1 | | 12/2002 | Andrews et al. |
| 6,654,612 B1 | * | 11/2003 | Avidor et al. ................. 455/450 |
| 2002/0075835 A1 | | 6/2002 | Krishnakumar et al. |
| 2002/0176437 A1 | * | 11/2002 | Busch et al. .................. 370/437 |
| 2003/0053437 A1 | | 3/2003 | Bahl et al. |
| 2003/0087645 A1 | * | 5/2003 | Kim et al. ..................... 455/453 |

FOREIGN PATENT DOCUMENTS

| | | |
|---|---|---|
| EP | 1257092 A1 | 11/2002 |
| EP | 1387596 A1 | 4/2004 |
| WO | 9517724 A1 | 6/1995 |
| WO | 0180500 A2 | 10/2001 |
| WO | 02091788 A2 | 11/2002 |

OTHER PUBLICATIONS

Xue et al, "Basestation Collaboration in Bluetooth Voice Networks", Computer Networks 41, 2003, pp. 289-301.

* cited by examiner

*Primary Examiner* — Lester Kincaid
*Assistant Examiner* — Daniel Lai
(74) *Attorney, Agent, or Firm* — Larry Liberchuk

(57) ABSTRACT

Wireless networks in ISM bands are usually established by placing access points that link terminals to each other and to networks. This situation may pose problems when networks are established individually without coordination, for example, in different apartments of apartment buildings. According to the present invention, access points establish a communication channel, linking each other, to cooperatively coordinate and optimize the use of frequencies/channels. Advantageously, interferences occurring in such networks may be reduced.

5 Claims, 3 Drawing Sheets

CHANNEL COORDINATION IN WIRELESS NETWORK SYSTEMS

Wireless local area networks (LANs) have been developed as an enhanced replacement for wired LANs. In a wireless LAN for data communication, a plurality of (mobile) network stations (for example, personal computers, telecommunications devices etc.) are present, which are capable of wireless communication. As compared to wired LANs, data communication in wireless LANs can be more versatile, due to the flexibility of the arrangement of network stations in the area covered by the LAN, and due to the absence of cables and connections.

Wireless LANs are generally implemented according to the standard as defined by the ISO-IEC 8802-11 international standard (IEEE 802.11). IEEE 802.11 describes a standard for wireless LAN systems that will operate in the 2.4-2.5 GHz ISM (Industrial Scientific and Medical) band. This ISM band is available worldwide and allows unlicensed operation for spread spectrum systems. For both the US and Europe, the 2,400-2,483.5 MHz band has been allocated, while for some other countries, such as Japan, another part of the 2.5-2.4 GHz ISM band has been assigned. The IEEE 802.11 standard focuses on the MAC (Medium Access Control) and PHY (Physical Layer) protocols for access points (APs) based networks and ad hoc networks.

In AP based wireless networks, the stations within a group or cell may communicate directly with the AP. This AP forwards messages to the destination station within the same cell or through the wired distribution system to another AP, from which such messages finally arrive at the destination station. In ad hoc networks, the stations operate on a peer to peer level and there is no AP or (wired) distribution system.

The 802.11 standard supports three PHY protocols. DSSS (Direct Sequence Spread Spectrum), SHSS (Frequency Hopping Spread Spectrum), and infra-red with PPM (Pulse Position Modulation). All these three PHYs provide bit rates of one and two Mbit/s. Furthermore, IEEE 802.11 includes extensions 11a and 11b, which allow for additional higher bit rates: extension 11b provides bit rates 5.5 and 11 Mbit/s as well as the basic DSS bit rates of 1 and 2 Mbit/s within the same 2.4-2.5 GHz ISM band. Extension 11a provides a high bit rate OFDM (Orthogonal Frequency Division Multiplexing Modulation) PHY standard, providing bit rates in the range of 6 to 54 Mbit/s in the 5 GHz band.

Such wireless networks in the ISM band are usually established by placing access points that link terminals to each other and to a core network such as a public switch telephone network (PSTN), an integrated services digital network ISDN, or a packet switch public data network PSPDN. Every DSSS-AP may operate on one channel. The number of channels depends on the regulatory domain in which the wireless LAN is used (for example, 11 channels in the US in the 2.4 GHz band). This number can be found in ISO/IEC 8802-11, ANSI/IEEE Std 802.11. Edition 1999-00-00. Overlapping cells using different channels may operate simultaneously without interference, if the channel distance is at least 3.

Such wireless networks in ISM bands are usually established by placing access points that link terminals to each other and to a core network, such as a public switch telephone network PSTN, an integrated service digital network ISDN or a packet switch public data network PSPDN. Thus, problems such as increased interference may occur in overlapping cells, in case networks are established by individually placing access points and setting the channels. Such situations often occur, for example, if wireless networks in ISM bands are established in an uncoordinated manner, for example, in different apartments of apartment buildings. In such situations, a high interference may occur in the individual networks, and hence a degradation of quality and bandwidth. Furthermore, such uncoordinated networks may have a low spectral efficiency and hence an early saturation of the total system capacity.

It is an object of the present invention to provide for an improved coordination of communication channels of access points (AP) of wireless network systems.

According to an exemplary embodiment of the present invention, the above object may be solved by a wireless network comprising a first access point for providing a first communication channel to a first terminal and a second access point for providing a second communication channel to a second terminal. According to an aspect of this exemplary embodiment of the present invention, the first access point is adapted to build up a third communication channel to the second access point to coordinate a setting of the first and second communication channels.

Advantageously, due to this exemplary embodiment of the present invention, a wireless network system may be provided, the access points of which are enabled to cooperatively coordinate and optimize the use of frequencies or channels in a certain neighborhood of terminals. Advantageously, interference occurring may be reduced and the spectral efficiency of the system may be improved in comparison to systems where no coordination of a setting of the communication channels of the access points is performed.

According to another exemplary embodiment of the present invention, the first access point performs a detection for another access point. Due to this, advantageously, a new access point, such as the first access point, may be placed in the vicinity of other already existing cells. Then, the access point in the wireless network system according to the present invention may automatically detect other network points and coordinate the channel setting. Thus, problems occurring due to overlapping cells and uncoordinated channels may be avoided.

According to another exemplary embodiment of the present invention, the first access point is adapted to determine whether or not there are any free channels. In case the first access point determines that there are free channels, the free channels are set and/or assigned to other access points, such that interference is reduced and the spectral efficiency is improved.

According to another exemplary embodiment of the present invention, in case there are no free channels, the first access point requests interference and channel usage access points from other access points and then performs the channel assignment on the basis of an optimized channel lay-out computed by the first access point. Advantageously, due to this exemplary embodiment of the present invention, a cooperative cells optimization of the channels (for example, the frequencies) is performed.

According to another exemplary embodiment of the present invention, a clustering may be performed, such that the access points within a prescribed range are split into groups of cooperating access points. According to an aspect of this exemplary embodiment of the present invention, the groups may be assigned according to proximity derived from a radio performance.

According to another exemplary embodiment of the present invention, the communication channels correspond to frequencies in the ISM band.

According to another exemplary embodiment of the present invention, an access point device is provided for use in a wireless network system, which, according to an aspect of this exemplary embodiment of the present invention, is adapted to build up a communication channel to another access point to coordinate a setting of the communication channels. According to an aspect of this exemplary embodiment of the present invention, the communication channel to coordinate the channel setting may be established via the core network or via a wireless channel. Due to this, an access point may be provided, which may, in an uncoordinated manner, be placed in the vicinity of already existing networks, which may then automatically coordinate its channel setting with the other access points of the surrounding networks.

According to another exemplary embodiment of the present invention, a method is provided of operating an access point of a wireless network, such that a communication channel is set up to another access point in order to coordinate a setting of the communication channel. Advantageously, due to this exemplary embodiment of the present invention, interference caused in adjacent wireless networks or cells of wireless networks may be reduced.

It may be seen as the gist of an exemplary embodiment of the present invention that at least one access point is provided, which builds up a communication channel, for example, via the core network or wirelessly, to another access point to coordinate the use of frequencies/channels between each other. According to an aspect of the present invention, as soon as a first access point is switched on, it may scan the use of channels/frequencies in the surrounding vicinity and build up a map of the radio connections. This map may be permanently updated. On detection of another access point within radio reach, it establishes a control connection to that access point. In case there are free channels/frequencies for communications with "his" terminals, the access point selects such a free frequency/channel or may assign one of these free frequencies/channels to the other access point for communication with the respectively assigned terminals. In case there are no free frequencies/channels, a dedicated network point, such as, for example, the one with the highest or lowest identifier requests interference and channel usage maps from other access points to compute an optimized frequency/channel lay-out on the basis of these interference and channel usage maps. On the basis of this, the frequencies/channels are assigned to the access points.

These and other aspects of the present invention will become apparent from and elucidated with reference to the embodiments described hereinafter.

Exemplary embodiments of the present invention will be described in the following, with reference to the following drawings:

FIG. 1 shows a simplified schematic representation of an exemplary embodiment of a network system, including access points according to exemplary embodiments of the present invention.

Figure 1:
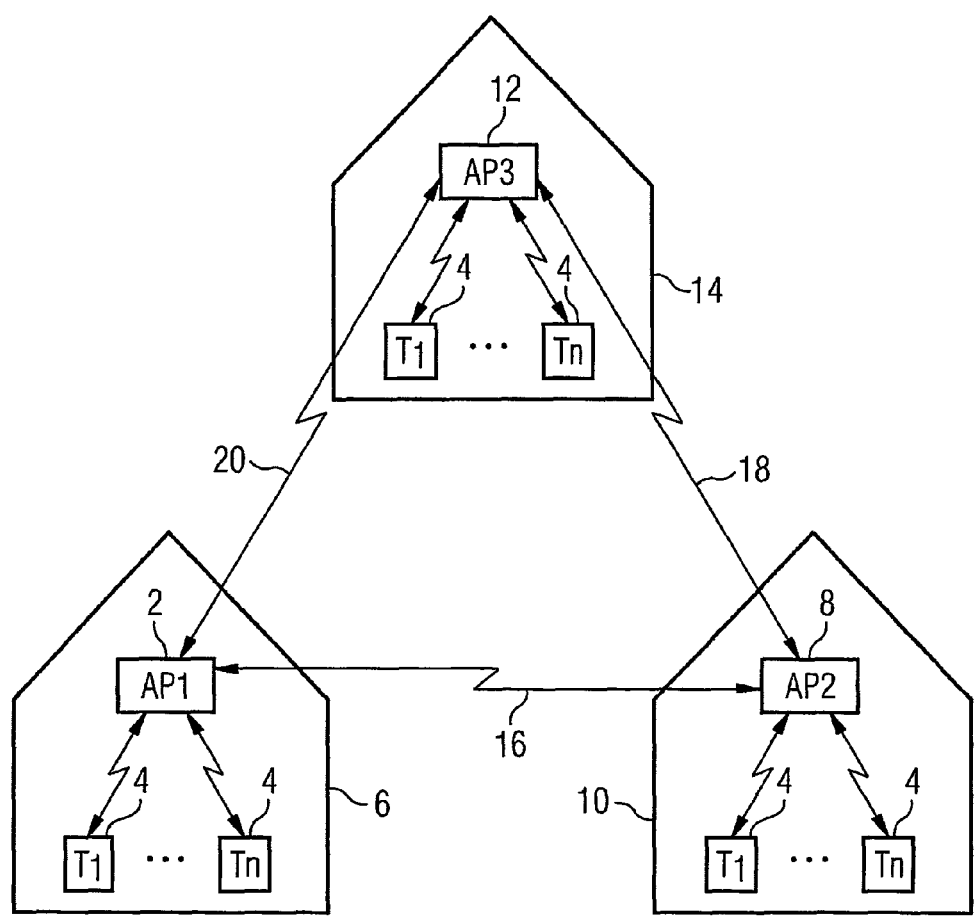
FIG. 1 shows a simplified schematic representation of a wireless network system according to an exemplary embodiment of the present invention.

Reference numeral 2 in FIG. 1 designates a first access point AP1 for establishing radio communications to and among terminals $T_1$ to $T_n$, which are designated by reference numerals 4. The terminals 4 may be arranged within the cell 6, which is determined by the radio reach of the access point AP2. As indicated by the communication link 16 between the access point AP1 2 and another access point AP2 8, the access point AP1 2 is adapted to establish a communication to another access point AP2 8. The access point AP2 8 defines another radio cell 10. The access point AP2 8 is arranged for providing a communication to, from and among terminals $T_1 \ldots T_n$ 4. Furthermore, access points AP1 2 and AP2 8 are respectively adapted for communicating to another access point AP3 12 via communication links 18 and 20. The access point AP3 12 defines another radio cell 14 for providing a communication to, from and among terminals $T_1 \ldots T_n$ 4. The communication between the access points 2, 8 and 12 and the terminals $T_1 \ldots T_n$ 4 are radio communications via ISM bands. A communication among the access points 2, 8 and 10 may either be a wireless communication via an air channel, which may also be in the ISM band, or may also take place via a core network, such as a PSTN network, an ISDN network or a PSPDN network.

Figure 2A:
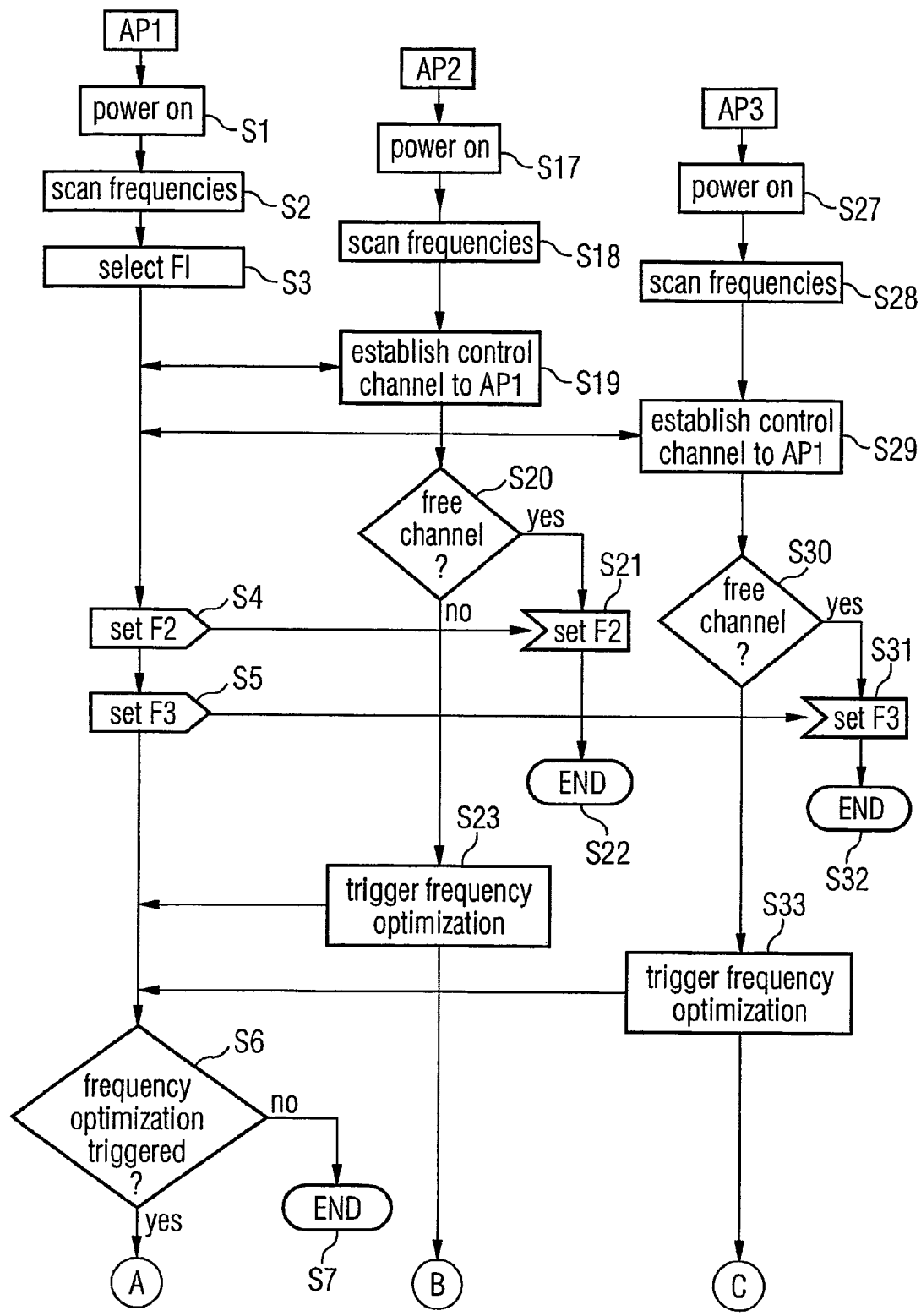
FIGS. 2a and 2b show a simplified sequence of operation diagram of an exemplary embodiment of a method of operating the wireless network system, including access points according to the present invention, as depicted in FIG. 1.
Figure 2B:
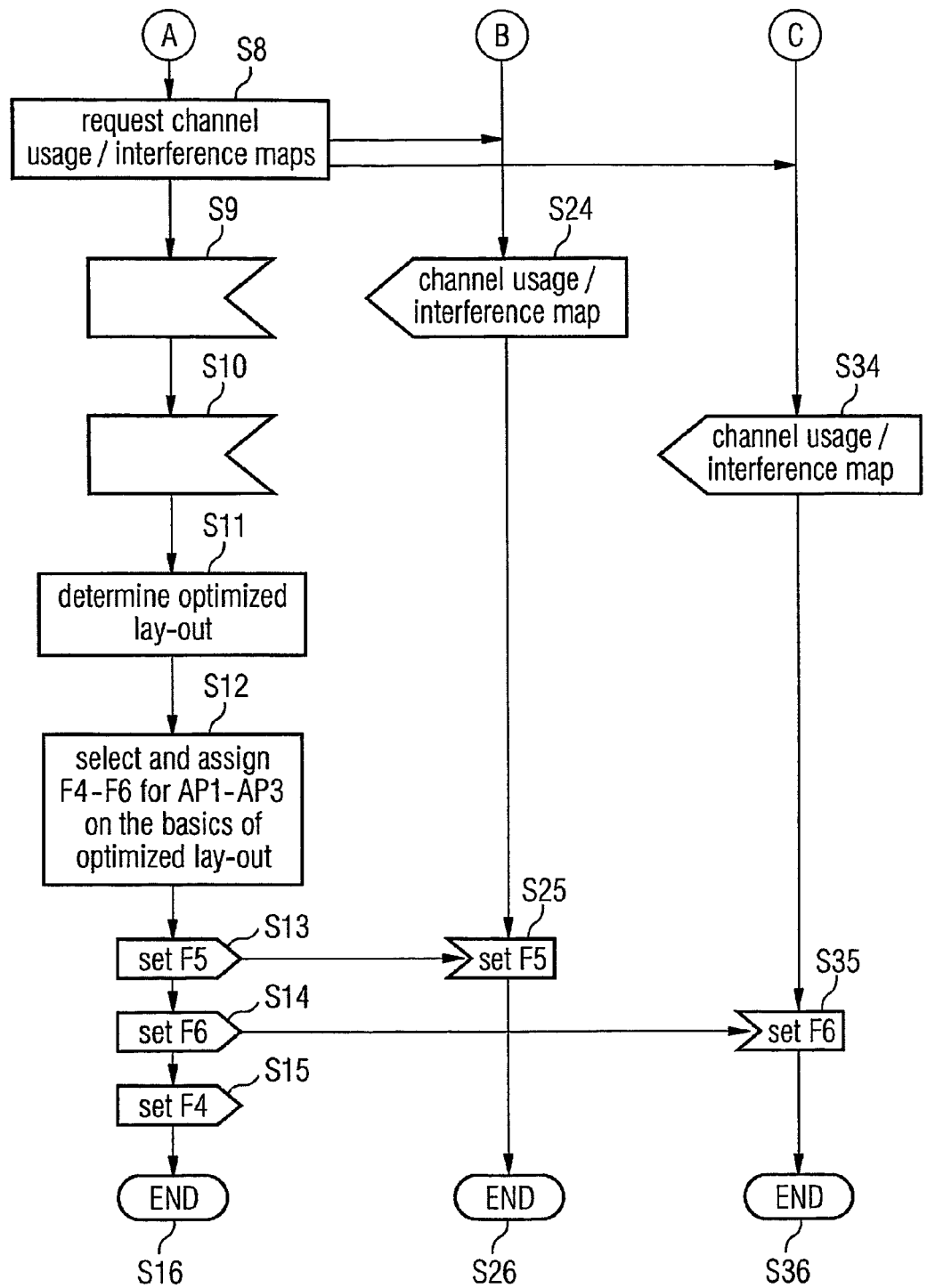

FIGS. 2a and 2b show a simplified sequence of operation diagram of a method of operating the wireless network system, including the access points according to an exemplary embodiment of the present invention.

In spite of the fact that FIGS. 2a and 2b depict a frequency coordination among the access points AP1, AP2 and AP3, the exemplary method according to the present invention depicted in FIGS. 2a and 2b is not limited to the frequency coordination, but is also applicable to a channel assignment in general.

As may be taken from FIG. 2a, after the access point AP1 is powered on in step S1, the access point AP1 performs a frequency scan for free frequencies in step S2. Then, in case AP1 has found a free frequency, i.e. a frequency which is not used by another access point within radio reach, the access point AP1 selects a first frequency F1 in step S3 for communication with "his" terminals 4, i.e. the terminals within its own radio cell 6 defined by its own radio reach.

Parallel thereto, after the access point AP2 has been powered on in step S17, the access point AP2 performs a frequency scan for free frequencies in step S18. Also, parallel thereto, after being powered on in step S27, the access point AP3 performs a scan for free frequencies in step S28.

The frequency scans performed by the access points AP1, AP2 and AP3 in steps S2, S18 and S28 basically include a determination with respect to whether there are any other access points in the neighborhood. In case other frequencies are found in steps S2, S18 and S28, it is determined in the respective access point, that there are other access points in the neighborhood.

Due to the fact that during the frequency scan of the AP1 in step S2 the other access points AP2 and AP3 were still in the initialization phase and did not actively perform any communication to their terminals 4, the AP1 could, in case it found a free frequency and did not find any other access point in the neighborhood, select the frequency F1 in step S3 and start a communication with its terminals 4. Due to the fact that AP1 was already transmitting on frequency F1 during the scanning steps S18 and S28 of AP2 and AP3, each of AP2 and AP3 detected another access point, namely AP1, during the frequency scans in steps S18 and S28. Due to this, as indicated in steps S19 and S29, according to an aspect of the present invention, AP2 and AP3 establish a control channel to AP1. In other words, according to an aspect of the present invention, an access point according to an exemplary embodiment of the present invention establishes a control channel to another access point in case another access point has been identified during the preceding frequency scan.

According to another aspect of the present invention, a dedicated access point, here the access point with the lowest identifier, is selected to perform the frequency coordination. However, according to variants of this exemplary embodiment of the present invention, also the access point with the highest identifier or an arbitrarily selected access point of the access points may be selected to perform the frequency coordination. The communication between the access points may either be performed wirelessly, or via the core network. Also, the communication may be performed via multi-hop connections.

In case it is determined by AP2 that frequencies have been determined, for example, during the frequency scan in step S18, the method continues to step S21, where the access point AP1 coordinates the frequency setting of AP2, such that the frequency F2 is assigned in steps S4 and S21 to the AP2. Then, AP2 may initiate or continue its communication to its terminals 4 with the frequency F2. Then, the operation of AP2 continues from step S21 to step S22, where it ends.

In step S30, AP3 performs a determination as to whether or not there is a free channel. In case it is determined in step S30 that there is a free channel, AP1 coordinates the setting of the frequency of AP3, such that the free frequency F3 is assigned to AP3 in steps S5 and S31. Then, the operation of AP3 continues from S31 to S32, where it ends.

All communication between the access points AP1, AP2 and AP3 to assign the free channels F1, F2 and F3 to AP1, AP2 and AP3, may, as indicated above, be performed via a wireless radio path or via the core network. Also, it should be noted that, in spite of the fact that only a few communication arrows are shown between AP1, AP2 and AP3 for setting the communication frequencies F1, F2 and F3, further communications may take place between the access points AP1, AP2 and AP3, which are not shown in FIG. 2a, such as, for example, a communication from AP2 to AP1 that free channels have been determined in step S20 or from AP3 to AP1 that a free channel has been determined in step S30.

In case it was determined in steps S20 and S30 that there are no free channels, the operation of AP2 and AP3 continues to step S23 and S33. In steps S23 and S33, AP2 and AP3 trigger the frequency optimization in AP1. From step S23, as indicated by the encircled B at the bottom of FIG. 2a and the encircled B at the top of FIG. 2b, the method continues to step S24. From step S33, as indicated by the encircled C at the bottom of FIG. 2a and at the top of FIG. 2b, the operation continues to step S34.

In AP1, from step S5, the operation continues to step S6, where a determination is made with respect to whether the frequency optimization has been triggered or not. In case it is determined in step S6 that no frequency optimization has been triggered, the method continues to step S7, where it ends.

In case it is determined in step S6 that the frequency optimization has been triggered by AP2 or AP3, the method continues to step S8, as indicated by the encircled A at the bottom of FIG. 2a and at the top of FIG. 2b.

In step S8, AP1 requests channel usage/interference maps from AP2 and AP3.

AP2 and AP3 may be adapted to automatically determine or actualize respective channel usage/interference maps during the frequency scanning steps S18 and S28. In step S24, AP2 transmits its own channel usage/interference map to AP1, where it is received in step S9. In step S24, AP3 transmits its own channel usage/interference map to AP1, where it is received in step S10. Then, in step S11, AP1 determines an optimized frequency/channel lay-out based on the received channel usage/interference maps.

The determination of the optimized frequency/channel lay-out may be based on an arbitrary assignment up to a highly complex algorithm, as used, for example, for off-line determination of mobile telecommunication networks. A selection of a method for determining the optimized lay-out in step S11 may be selected with respect to the computing means provided in AP1. Furthermore, a selection of the method used in step S11 may depend on the availability of AP1, as well as on the compute-intensiveness that can be tolerated by the implementation of the respective access point.

In very dense settings, the number of access points incorporated by this system might be very high, leading to some overhead for communicating the control information, as well as dramatically increasing the effort for computing the lay-out. According to an aspect of the present invention, a clustering algorithm may then be performed in steps S11 and S12, according to which the overall number of access points is split into groups of cooperating access points. Such clustering may be performed, for example, on the basis of a proximity derived from radio performance, i.e. an intensity of the respectively received radio signals. Such clustering may be performed automatically as soon as a certain prescribed number of access points is reached.

Furthermore, while such groups may then operate independently, a flipping back and forth of the respective frequencies may occur, due to independent decisions in each group. According to a further aspect of this exemplary embodiment of the present invention, the dedicated access points of each group may then establish again a control network amongst themselves, similar to the network inside the group, and use the core network or the wireless network to exchange the optimized lay-out they compute, such that a further optimization may be performed on the basis of the determined optimized lay-out of the respective dedicated network points. In other words, one dedicated access point may determine an optimized lay-out on the basis of the optimized lay-out from another dedicated network point of another group and the channel usage/interference maps received from the other access points of its own group. Thus, a hierarchical system may be implemented, by which, advantageously, an overhead for communicating the control information may be minimized.

From the calculation or determination of an optimized lay-out in step S11, the operation of AP1 continues to step S12, where, on the basis of the received information, AP1 selects and assigns frequencies F4 to F6 for AP1 to AP3 on the basis of the optimized lay-out. As indicated above, in case a hierarchical system is implemented, the selection and assignment of frequencies may, furthermore, be based on optimized lay-outs of other dedicated access points in other groups. Then, in subsequent step S13, AP1 assigns F5 to AP2, where it is set in S25 such that AP2 may now continue or initialize communication with its terminals with the frequency F5. From step S25, the operation of AP2 continues to step S26, where it ends. In step S14, AP1 sets and assigns the frequency F6 to AP3, where it is set in step S35. Then, after the setting of the frequency F6 in step S35, AP3 may continue or initialize communication to its terminals 4, with the frequency F6. Then, the operation of AP3 continues to step S36, where it ends.

The communication necessary in steps S13, S25, S14 and S35 may be implemented via a wireless air link, or via the core network.

Then, the operation of AP1 continues to step S15, where the frequency F4 is set to be the communication frequency for the communication with the terminals 4 of AP1. Then, from S15, the operation of AP1 continues to step S16, where it ends.

The operation described with reference to FIGS. 2a and 2b is applicable for any implementation of wireless local and personal area networks in ISM bands or other bands. For example, the present invention may be adapted and applied to IEEE 802.11 networks in the 2.5 and 5 GHz band, to Hiperlan/2 or others.

Advantageously, due to the present invention, access points are enabled to cooperatively coordinate and optimize the use of frequencies/channels in a certain neighborhood of terminals.

Furthermore, advantageously, according to the present invention, access points may be provided, which, on an initial power-on including a scanning of the frequencies used in a neighborhood, establish a logical connection to other APs in the neighborhood for the selection of an available channel and to coordinate the channel setting. Furthermore, according to an aspect of this exemplary embodiment of the present invention, during operation of the network, channel usage/interference maps showing the respective channel usage/interference maps in the neighborhood of the respective access points may be exchanged between the access points, such that an automated optimization may be performed. Furthermore, such regularly updated and exchanged channel usage/interference maps may be sent to dedicated access points, which then compute an optimized frequency usage pattern and distribute this to the access points for adaptation of the new layer.

The invention claimed is:

1. Wireless network system, comprising:
   a first access point for providing a first communication channel to a first terminal;
   a second access point for providing a second communication channel to a second terminal;
   wherein the first and second communication channels are wireless channels;
   wherein the first access point builds up a third communication channel to the second access point to coordinate a setting of the first and second communication channels;
   wherein the first access point performs a detection for the second access point;
   wherein the first access point establishes the third communication channel to the second access point when the second access point is detected via at least one of a core network and a wireless channel;
   wherein the first access point determines whether there is a first free channel and a second free channel;
   wherein, in case there are first and second free channels, the first access point controls a setting of the first and second communication channels on the basis of the first and second free channels; and
   wherein, in case there are no first and second free channels, the first access point:
      determines a first interference and channel usage map;
      requests a second interference and channel usage map from the second access point;
      determines an optimized channel lay-out on the basis of the first and second interference and channel usage maps; and
      controls the setting of the first and second communication channels on the basis of the optimized lay-out.

2. The wireless network according to claim 1, wherein a plurality of third access points is assigned to the first access point for coordinating communication channels to associated terminals; and wherein a plurality of fourth access points is assigned to the second access point for coordinating communication channels to associated terminals.

3. The wireless network of claim 1, wherein the first and second communication channels correspond to first and second frequencies in the ISM band.

4. Access point device for a wireless network system, wherein the access point device provides a first communication channel to a terminal; and builds up a second communication channel to another access point to coordinate a setting of the first communication channel; wherein the first and second communication channels are wireless channels;
   wherein the access point device further performs a detection for the other access point; and establishes a second communication channel to the other access point when the other access point is detected via at least one of a core network and a wireless channel;
   wherein the first access point further determines whether there is a first free channel; and
   wherein, in case there is the first free channel, the first access point further controls a setting of the first communication channel on the basis of the first free channel;
   wherein, in case there is no first free channel, the first access point further:
      determines a first interference and channel usage map;
      requests a second interference and channel usage map from the other access point;
      determines an optimized channel lay-out on the basis of the first and second interference and channel usage maps; and
      controls the setting of the first communication channel on the basis of the optimized lay-out.

5. Method of operating an access point of a wireless network, the method comprising:
   providing a first communication channel to a terminal;
   building up a second communication channel to another access point to coordinate a setting of the communication channel;
   performing a detection for the other access point;
   establishing a second communication channel to the other access point when the other access point is detected via at least one of a core network and a wireless channel;
   determining whether there is a first free channel;
   in case there is the first free channel:
      controlling a setting of the first communication channel on the basis of the first free channel;
   in case there is no first free channel:
      determining a first interference and channel usage map;
      requesting a second interference and channel usage map from the other access point;
      determining an optimized channel lay-out on the basis of the first and second interference and channel usage maps; and
      controlling the setting of the first communication channel on the basis of the optimized lay-out.

* * * * *